United States Patent [19]
Elterman et al.

[11] Patent Number: 5,261,343
[45] Date of Patent: Nov. 16, 1993

[54] CLEAT FOR FASTENING LINE OR ROPE

[76] Inventors: Charles W. Elterman, 20777 N. Laurel Dr., Barrington, Ill. 60010; Arnold K. Cohn, 1415 Meadow La., Glenview, Ill. 60025

[21] Appl. No.: 866,009
[22] Filed: Apr. 9, 1992
[51] Int. Cl.⁵ .............................................. B63B 21/04
[52] U.S. Cl. ...................................... 114/218; 24/130
[58] Field of Search ............... 114/218, 343, 364, 199, 114/108, 102; 24/130

[56] References Cited

U.S. PATENT DOCUMENTS

| | | | |
|---|---|---|---|
| 717,777 | 1/1903 | Smith | 24/130 |
| 726,797 | 4/1903 | Flower | 24/130 |
| 861,873 | 7/1907 | MacGregor | 24/130 |
| 3,675,276 | 7/1972 | Nuse | 24/130 |
| 3,828,714 | 8/1974 | Perkins | 114/218 |
| 4,683,831 | 8/1987 | Shaffner | 114/218 |
| 4,964,355 | 10/1990 | Milewski | 114/218 |

FOREIGN PATENT DOCUMENTS

| | | | |
|---|---|---|---|
| 1256582 | 11/1967 | Fed. Rep. of Germany | 24/130 |
| 6421 | of 1898 | United Kingdom | 24/130 |
| 383870 | 11/1932 | United Kingdom | 24/130 |

Primary Examiner—Michael S. Huppert
Assistant Examiner—Thomas J. Brahan
Attorney, Agent, or Firm—Dressler, Goldsmith, Shore & Milnamow, Ltd.

[57] ABSTRACT

A cleat for fastening a rope comprises a head and a stem extending downwardly from the head. The head has four notches demarcating two side projections and two end projections. The side projections extend respectively from opposite sides of the head. The end projections extend respectively from opposite ends of the head. Each notch opens outwardly and is generally V-shaped so that a rope can be wedged in such notch. The rope can be fastened to the cleat by passing the rope upwardly through one notch, pulling the rope along one side projection, passing the rope downwardly through another notch, pulling the rope along one end projection, passing the rope upwardly through another notch, pulling the rope longitudinally along the other side projection, and passing the rope downwardly through the other notch, so that the rope is wedged in each notch and is self-tightening therein.

2 Claims, 2 Drawing Sheets

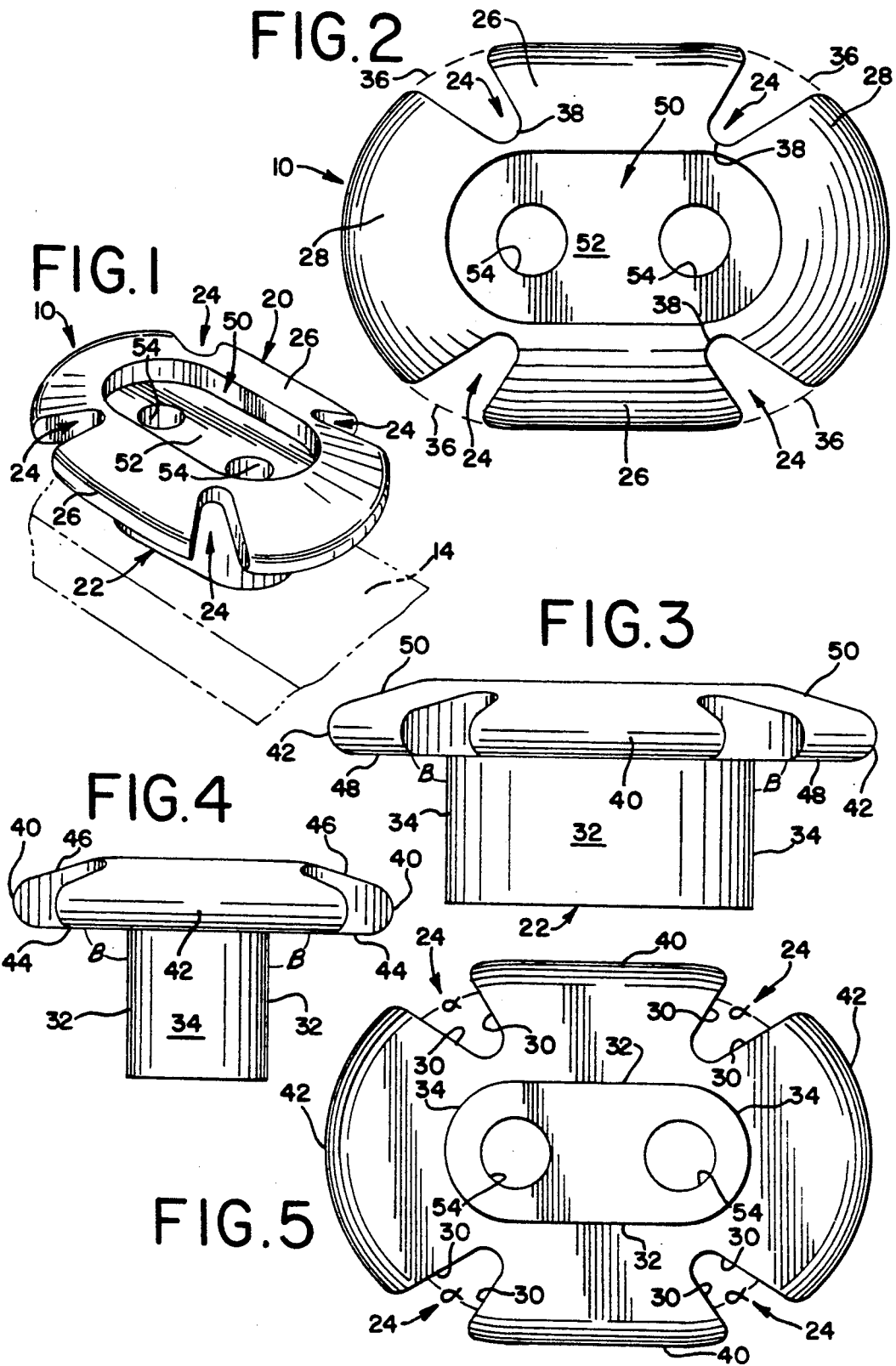

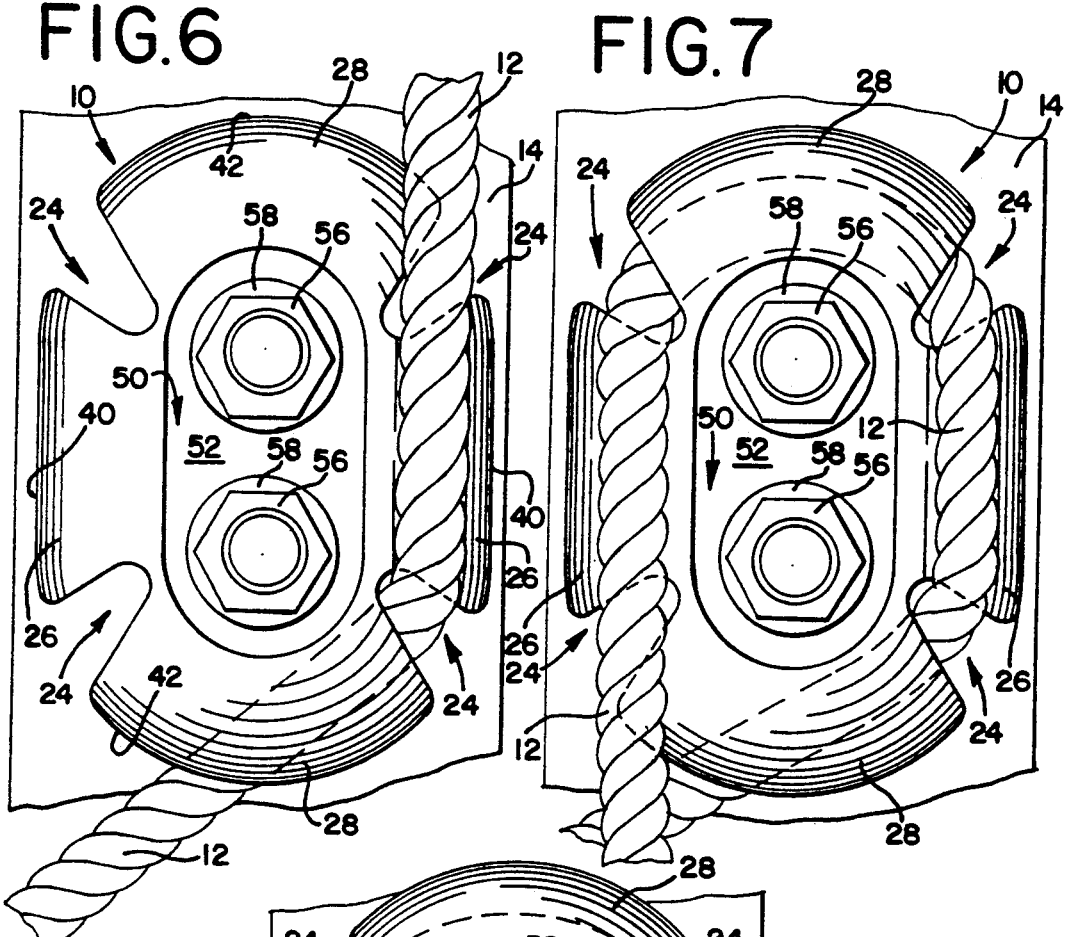

CLEAT FOR FASTENING LINE OR ROPE

TECHNICAL FIELD OF THE INVENTION

This invention pertains to a cleat for fastening a line, such as a line or rope used on a boat, a dock, a truck bed, or a construction site. The cleat has a head with a plurality of generally V-shaped notches demarcating a plurality of projections. When fastened to the cleat, the line or rope is wedged into the notches, so as to be self-tightening.

BACKGROUND OF THE INVENTION

Conventionally, a cleat of a type used on a sailboat, on a truck bed, or elsewhere has a head with two projecting horns, on a stem. It is known to fasten a line or rope to such a cleat with a "figure eight winding" to avoid slippage of the line or rope. Fastening a line or rope to such a cleat with a "figure eight winding" is a learned skill.

Although such cleats have enjoyed time-honored usage, it would be nonetheless desirable to provide a cleat that would enable a line or rope to be easily fastened thereto by a user who might not be well skilled in "figure eight winding."

The terms "line" and "rope" are used interchangeably herein to refer to a rope of any type made of natural or synthetic fibers and used heretofore with cleats of the type noted above. The term "line" is preferred in some applications including sailing. The term "rope" is preferred in other applications.

SUMMARY OF THE INVENTION

This invention provides a novel cleat for fastening a line or rope. The cleat comprises a head and a stem extending downwardly from the head. The head has a plurality of generally V-shaped notches demarcating a plurality of projections, preferably four such notches demarcating two side projections and two end projections. The side projections extend respectively from opposite sides of the head. The end projections extend respectively from opposite ends of the head. Each notch opens outwardly and is generally V-shaped so that a line or rope can be wedged in such notch.

The stem may be elongate with generally semi-cylindrical ends. Each notch may have a wide end opening outwardly and a narrow end located near one extremity of one of the generally semi-cylindrical ends. Each side projection may have an elongate edge. Each end projection may have a generally arcuate edge.

Preferably, each of the end projections has an upper surface meeting the stem at a line of intersection defining approximately a right angle at each point along the line of intersection. Preferably, moreover, each of the side and end projections has an upper surface tapering downwardly and outwardly toward the edge of such projection.

Herein, directional terms such as "downwardly", "sides", "ends", "lower", and "upper" refer to the cleat in an exemplary orientation and are not intended to limit the cleat to any particular orientation.

These and other objects, features, and advantages of this invention are evident from the following description of a preferred embodiment of this invention with reference to the accompanying drawings.

BRIEF DESCRIPTION OF THE DRAWINGS

FIG. 1 is a fragmentary, perspective view of a cleat according to this invention, as mounted in an exemplary orientation on a deck rail of a sailboat.

FIG. 2 is a top plan view of the cleat.

FIG. 3 is a bottom plan view of the cleat.

FIG. 4 is a side elevational view of the cleat.

FIG. 5 is an end elevational view of the cleat.

FIG. 6 is a fragmentary, top plan view showing a line at an early stage in being fastened to the cleat.

FIG. 7 is a view similar to FIG. 6, but showing the line at a later stage in being fastened to the cleat.

FIG. 8 is a view similar to FIGS. 6 and 7, but showing the line at a final stage in being fastened to the cleat.

DETAILED DESCRIPTION OF PREFERRED EMBODIMENT

As shown in an exemplary orientation in the drawings, a cleat 10 used for fastening a line 12 (see FIGS. 6, 7, and 8) to a deck rail 14 of a sailboat constitutes a preferred embodiment of this invention. In a similar or different orientation, the cleat 10 would have other uses, as in fastening a rope to a truck bed or to a structure on a construction site.

The cleat 10 comprises a head 20 and a stem 22 extending downwardly from the head 20. The head 20 has four notches 24 demarcating two side projections 26 and two end projections 28. The side projections 26 extend respectively from opposite sides of the head 20. The end projections 28 extend respectively from opposite ends of the head 20. Each notch 24 opens outwardly and is generally V-shaped so that the line 12 can be wedged in such notch 24. As shown in FIG. 5, each notch 24 has two walls 30 defining an angle $\alpha$ of approximately 45° relative to each other.

As shown in FIG. 5 the stem 22 is oblong with generally planar sides 32 and generally semi-cylindrical ends 34. As shown in FIG. 2, each notch 24 has a wide end 36 opening outwardly and a narrow end 38 located near one extremity of one of the generally semi-cylindrical ends 34. The narrow end 38 of each notch 24 is rounded.

Each side projection 26 has an elongate edge 40. Each end projection 28 has a generally arcuate edge 42. As shown in FIGS. 3 and 4, each of the edges 40, 42, has a rounded profile.

As shown in FIG. 4, each side projection 26 has a lower surface 44 and an upper surface 46, which tapers downwardly and outwardly toward the edge 40 of such side projection 26. As shown in FIG. 3, each end projection 28 has a lower surface 48 and an upper surface 50, which tapers downwardly and outwardly toward the edge 42 of such end projection 28. Each of the lower surfaces 44, 48, meets the stem 22 at a line of intersection defining approximately a right angle $\beta$ at each point along the line of intersection.

As shown in FIGS. 3, 4, and 5, the lower surfaces 44 of the projections 26 and the lower surfaces 48 of the projections 28 define a generally horizontal, imaginary plane where such surfaces 44, 48, meet the downwardly extending stem 22. The walls 30 of each notch 24 define an acute angle relative to each other, namely the angle $\alpha$ noted above, where such walls 30 intersect the imaginary plane.

The head 20 has an oblong cavity 50 opening upwardly and having a flat floor 52. The cleat 10 has two elongate, cylindrical holes 54, which extend downwardly from the cavity floor 52, through the stem 22. These holes 54 accommodate the shanks of stainless steel bolts having hex heads 56 (see FIGS. 6, 7, and 8) and being used to mount the cleat 10 securely to the deck rail 14. A stainless steel washer 58 is interposed between each of the heads 56 and the cavity floor 52.

The cleat 10 may be advantageously molded from aluminum or an engineering polymer, such as polypropylene, polybutylene, or acrylonitriles, preferably polypropylene. The plastic cleat 10 may contain a dye or colorant and be brightly colored, for high visibility. The cleat 10 may be alternatively machined from stainless steel or a suitable hardwood.

Preferably, as shown, the cleat 10 is made as a single piece. The head 20 and the stem 22 may be alternatively made as separate pieces joined by the bolts used to mount the cleat 10. The cleat 10 may be made in different sizes to accommodate lines or ropes of different sizes.

As shown in successive stages in FIGS. 6, 7, and 8, the line 12 can be easily fastened to the cleat 10, even by an unskilled user. First, as shown in FIG. 6, the line 12 is passed beneath a portion of one of the end projections 28 and upwardly through one of the notches 24 whereupon the line 12 is pulled longitudinally along the upper surface 46 of one of the side projections 26. Next, as shown in FIG. 7, the line 12 is passed downwardly through another of the notches 24, pulled transversely along the lower surface 48 of one of the end projections, around one of the semi-cylindrical ends 34 of the stem 22, and passed upwardly through another of the notches 24. Finally, as shown in FIG. 8, the line 12 is pulled longitudinally along the upper surface 46 of the other side projection 26 and passed downwardly through the remaining notch 24. As the line 12 is passed through each notch 24, the line 12 is wedged into such notch 24.

Alternatively, the line 12 can be wrapped once or twice around the stem 22, pulled through two opposing notches 24, wrapped once more around the stem 22 in the opposite direction from the original wrap and pulled through a notch 24.

Advantageously, as the line 12 is tensioned, the line 12 is self-tightening in the notches 24. There is no need to use a "figure eight winding" to fasten the line 142 to the cleat 10.

Various modifications may be made in the preferred embodiment described above without departing from the scope and spirit of this invention.

I claim:

1. A cleat for fastening a rope, the cleat comprising a head and a stem extending downwardly from the head, the head having a plurality of notches demarcating a plurality of projections, each notch opening outwardly in a generally V-shaped configuration so that a rope can be laterally wedged into such notch, the projections having lower surfaces defining a generally horizontal, imaginary plane, each notch having two walls defining an acute angle relative to each other where the walls intersect the imaginary plane defined by said surfaces wherein the stem is elongate with semi-cylindrical ends; each notch has a wide end opening outwardly and a narrow end located near one extremity of one of the generally semi-cylindrical ends; and each of the end projections meets the stem at a line of intersection defining approximately a right angle at each point along the line of intersection.

2. A cleat for fastening a rope, the cleat comprising a head and a stem extending downwardly from the head, the head having a plurality of notches demarcating a plurality of projections, each notch opening outwardly in a generally V-shaped configuration so that a rope can be laterally wedged into such notch, the projections having lower surfaces defining a generally horizontal, imaginary plane, each notch having two walls defining an acute angle relative to each other where the walls intersect the imaginary plane defined by said surfaces wherein the stem is elongate with semi-cylindrical ends; each notch has a wide end opening outwardly and a narrow end located near one extremity of one of the generally semi-cylindrical ends; and each projection has an upper surface tapering downwardly and outwardly toward an edge of such projection and the edge of each side projection is elongate and the edge of each end projection is generally arcuate.

* * * * *